(12) United States Patent
Bennette

(10) Patent No.: US 10,973,097 B2
(45) Date of Patent: Apr. 6, 2021

(54) SYSTEMS, DEVICES, AND METHODS FOR POWER PULSE TIMING FOR A LIGHT FIXTURE

(71) Applicant: Electronic Theatre Controls, Inc., Middleton, WI (US)

(72) Inventor: Adam Bennette, London (GB)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/832,482

(22) Filed: Mar. 27, 2020

(65) Prior Publication Data

US 2020/0314988 A1    Oct. 1, 2020

Related U.S. Application Data

(60) Provisional application No. 62/826,434, filed on Mar. 29, 2019, provisional application No. 62/826,445, (Continued)

(51) Int. Cl.
*H05B 47/16* (2020.01)
*H05B 45/335* (2020.01)
(Continued)

(52) U.S. Cl.
CPC .............. *H05B 45/10* (2020.01); *A01G 7/045* (2013.01); *F21S 10/06* (2013.01); *G06F 3/0482* (2013.01); *G06F 3/04847* (2013.01); *G06F 3/14* (2013.01); *H04N 5/2256* (2013.01); *H04N 5/2351* (2013.01); *H04N 5/2354* (2013.01); *H05B 45/22* (2020.01); *H05B 45/325* (2020.01); *H05B 45/335* (2020.01); *H05B 47/16* (2020.01); *F21W 2131/109* (2013.01)

(58) Field of Classification Search
None
See application file for complete search history.

(56) References Cited

U.S. PATENT DOCUMENTS

2008/0265177 A1    10/2008  Connally et al.
2012/0018356 A1*   12/2012  Jalink et al. .............. B07C 5/00
                                                       250/458.1
2019/0360936 A1*   11/2019  Fodgaard et al. ..... G01N 21/64

FOREIGN PATENT DOCUMENTS

WO    2016051207 A2    4/2016
WO    2018050501 A1    3/2018

OTHER PUBLICATIONS

International Search Report and Written Opinion for Application No. PCT/US2020/025254 dated Jun. 25, 2020 (17 pages).

* cited by examiner

*Primary Examiner* — Dedei K Hammond
(74) *Attorney, Agent, or Firm* — Michael Best and Friedrich LLP

(57) ABSTRACT

A system for generating a light pulse causes fluorescence in an object. The system includes a light emitting diode ("LED") light source to emit light onto the object. The light source has an operational radiant flux. The system also includes an imaging sensor to sense light emitted due to fluorescence in the object. The system further includes a controller electrically coupled to the light source. The controller is able to drive the light source to produce a pulse of light at a pulse radiant flux. The controller is also able to inhibit the light source after the pulse for a darkness period. The pulse radiant flux of the light produced by the light source is higher than the operational radiant flux of the light source.

20 Claims, 5 Drawing Sheets

Related U.S. Application Data filed on Mar. 29, 2019, provisional application No. 62/826,449, filed on Mar. 29, 2019, provisional application No. 62/829,859, filed on Apr. 5, 2019.

(51) Int. Cl.
| | |
|---|---|
| *F21S 10/06* | (2006.01) |
| *H05B 45/10* | (2020.01) |
| *H05B 45/325* | (2020.01) |
| *A01G 7/04* | (2006.01) |
| *H04N 5/225* | (2006.01) |
| *H04N 5/235* | (2006.01) |
| *H05B 45/22* | (2020.01) |
| *G06F 3/0482* | (2013.01) |
| *G06F 3/0484* | (2013.01) |
| *G06F 3/14* | (2006.01) |
| *F21W 131/109* | (2006.01) |

SYSTEMS, DEVICES, AND METHODS FOR POWER PULSE TIMING FOR A LIGHT FIXTURE

RELATED APPLICATIONS

This application claims the benefit of U.S. Provisional Patent Application No. 62/826,434, filed Mar. 29, 2019, U.S. Provisional Patent Application No. 62/826,445, filed Mar. 29, 2019, U.S. Provisional Patent Application No. 62/826,449, filed Mar. 29, 2019, and U.S. Provisional Patent Application No. 62/829,859, filed, Apr. 5, 2019, the entire contents of each of which is hereby incorporated by reference.

FIELD

Embodiments described herein relate to controlling the output of a light fixture.

SUMMARY

Objects, such as plants or crops, can fluoresce after being exposed to a bright pulse of light, and the fluorescence that results from the bright pulse of light can be detected. Conventionally, such detection is achieved using a flash tube or flash lamp, a timer, and a detector. Absent a flash tube, conventional light sources (e.g., incandescent lamps) found in light fixtures were incapable of momentarily increasing their output by a significant amount (e.g., an amount needed to cause fluorescence). Such a control technique could risk damaging a filament in the light source.

Embodiments described herein provide systems, devices, and methods for generating a light pulse using light sources in a light fixture (e.g., a growing luminaire) to cause fluorescence in an object, such as a plant or crop. The light fixture includes a plurality of arrays of light sources and each light source includes a plurality of LEDs. A controller controls drive signals provided to the arrays of light sources such that the light sources operate at above a standard operational power value. By driving the lights sources at such a high power level, a pulse of light is generated having radiant flux (e.g., in Watts) that causes fluorescence in the object.

Systems described herein provide for generating a light pulse to cause fluorescence in an object. The systems include a light emitting diode ("LED") light source to emit light onto the object. The LED light source has a maximum standard or operational radiant flux. The systems also include an imaging sensor to sense light emitted due to fluorescence in the object. The systems further include a controller electrically coupled to the LED light source. The controller is able to drive the LED light source to produce a pulse of light at a pulse radiant flux, and reduce the radiant flux of light produced by the LED light source to below a predetermined value after the pulse for a darkness period. The pulse radiant flux of the light produced by the LED light source is greater than the maximum standard or operational radiant flux of the LED light source.

Methods described herein provide for operating a light emitting diode ("LED") light source to cause fluorescence in an object. The methods include inhibiting the LED light source from producing light having a radiant flux above a predetermined value during an initial period, and producing a pulse of light from the LED light source during a pulse period. The pulse of light has a pulse radiant flux that is greater than an operational radiant flux of the LED light source. The methods also include inhibiting the LED light source from producing light having a radiant flux above the predetermined value during a darkness period after the pulse period, and delaying a subsequent pulse of light from the LED light source for a delay period.

Devices described herein provide a non-transitory computer readable medium having stored thereon a program for operating a light emitting diode ("LED") light source to cause fluorescence in an object. The program is executable by a controller such that the controller is able to produce light from the LED light source at a baseline radiant flux value having a radiant flux that is at or below an operational radiant flux of the LED light source, inhibit the LED light source for an initial period, produce a pulse of light from the LED light source for a pulse period having a pulse radiant flux that is higher than the operational radiant flux of the LED light source, inhibit the LED light source after the pulse for a darkness period, and produce light from the LED light source at the baseline radiant flux value after the darkness period.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

DETAILED DESCRIPTION

Figure 1:
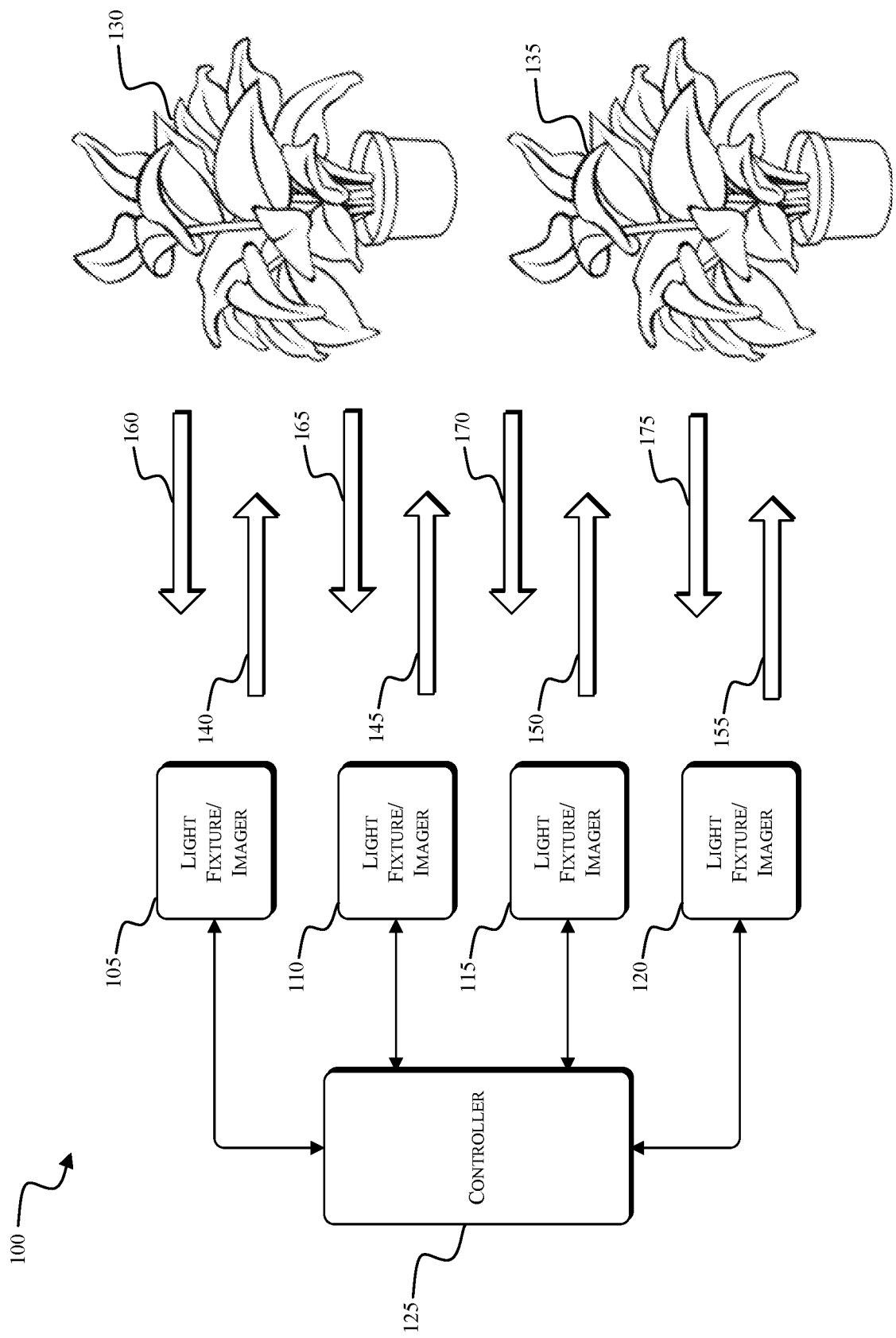
FIG. 1 illustrates a lighting system.

FIG. 1 illustrates a lighting system 100 that includes four light fixtures 105, 110, 115, and 120. In the illustrated embodiment, the light fixtures 105-120 are combined light fixtures and imaging devices or imagers (e.g., including an imaging sensor, a camera, etc.). In other embodiments, imaging devices separate from the light fixtures 105-120 are used. Each of the fixtures/imagers 105-120 is connected to a controller 125 in a wired or wireless manner for receiving control signals that control respective light outputs 140, 145, 150, and 155 of the fixtures/imagers 105-120. The fixtures/imagers 105-120 are configured to be capable of sensing the light 160, 165, 170, and 175 that is emitted due to fluorescence of an object, such as the plants 130, 135. In some embodiments, the fixtures/imagers 105-120 are configured to measure light in the range of approximately 1 micrometer (e.g., infrared light) to approximately 200 nanometers (e.g., ultraviolet light).

Figure 2:
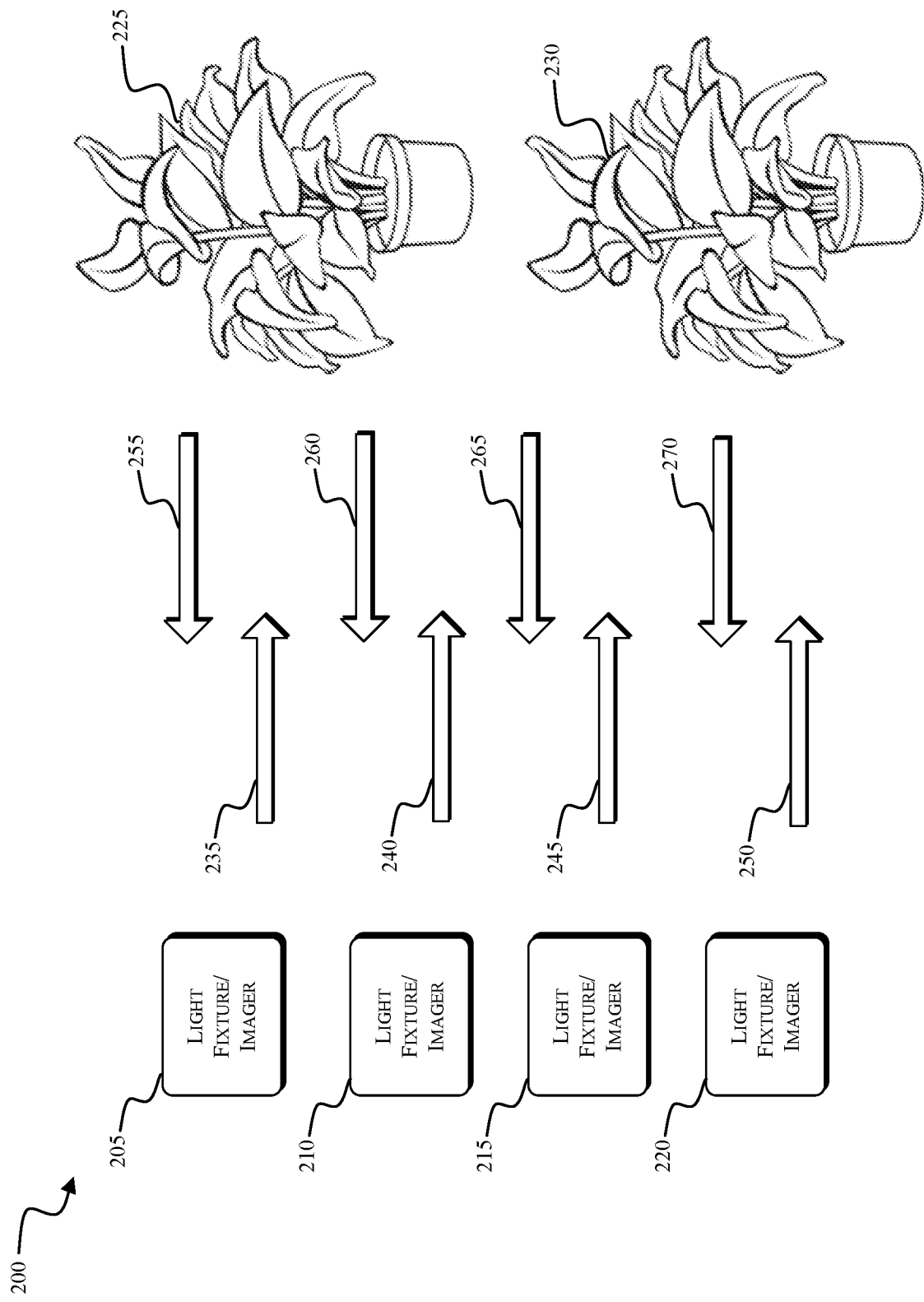
FIG. 2 illustrates a lighting system.

FIG. 2 illustrates a lighting system 200 that includes four light fixtures 205, 210, 215, and 220. In the illustrated embodiment, the light fixtures 205-220 are combined light fixtures and imaging devices or imagers (e.g., including an imaging sensor, a camera, etc.). In other embodiments, imaging devices separate from the light fixtures 205-220 are used. Each of the fixtures/imagers 205-220 includes its own internal controller for controlling respective light outputs 235, 240, 245, and 250 of the fixtures/imagers 205-220. The controllers internal to each of the fixtures/imagers 205-220 operate in a similar manner to the controller 125 in FIG. 1. An exemplary controller for the system 100 or fixtures 205-220 is described with respect to FIG. 3. The fixtures/imagers 205-220 are configured to be capable of sensing the light 255, 260, 265, and 270 that is emitted due to fluorescence of an object, such as the plants 225, 230. In some embodiments, the fixtures/imagers are configured to measure light in the range of approximately 1 micrometer (e.g., infrared light) to approximately 200 nanometers (e.g., ultraviolet light).

Figure 3:
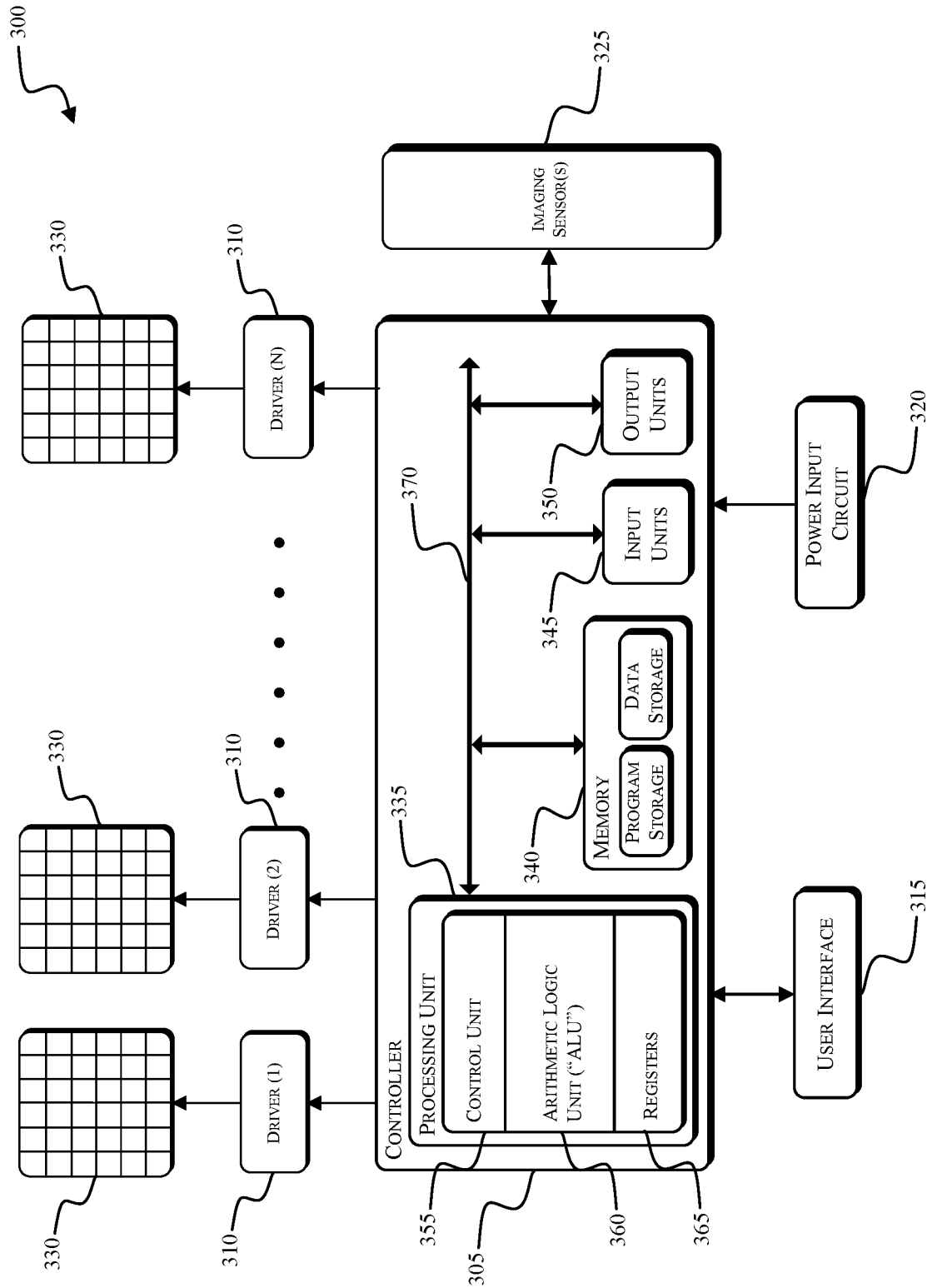
FIG. 3 illustrates a control system for implementing power pulse timing for a light fixture.

FIG. 3 illustrates a system 300 for controlling the outputs of a plurality of light sources (e.g., light sources corresponding to different wavebands of light). A controller 305 for the system 300 is electrically and/or communicatively connected to a variety of modules or components of the system 300. The controller 305 can correspond to, for example, the controller 125 of FIG. 1 or the internal controllers of the fixtures/imagers 205-220. For illustrative purposes, the controller 305 is shown as providing drive signals independently and discretely to a plurality of drivers 310 (e.g., driver [1] to driver [N]). The controller 305 is also connected to a user interface 315, a power input circuit 320, and an imaging sensor 325 (e.g., a monochrome camera, a fluorimeter, etc.). The drivers 310 are each individually connected to an array of light sources 330 (e.g., LEDs). Each array of light sources 330 is configured to generate a narrow band light output (e.g., within a variance range of +/−10 nanometers of emitter central wavelength). Each array of light sources 330 is also configured to emit narrow band light outputs corresponding to different wavelengths of light. For example, a first array of light sources can produce light corresponding to infrared light (i.e., wavelengths in the range of approximately 800 nanometers to 1 micrometer). A final array of light sources can produce light corresponding to ultraviolet light (i.e., wavelengths in the range of approximately 200 nanometers to 400 nanometers). In some embodiments, the system 300 includes at least ten arrays of light sources 330 (e.g., between 10 and 35 arrays of light sources 330). In other embodiments, the system 300 includes fewer than ten arrays of light sources 330. The arrays of light sources 330 can, for example, be spectrally evenly spaced with respect to one another (e.g., consistent wavelength gaps between arrays along the electromagnetic spectrum) or the arrays of light sources 330 can be spectrally unevenly spaced such that some arrays are closer to spectrally adjacent arrays than others.

The controller 305 includes combinations of hardware and software that are operable to, among other things, control the operation of the system 300, control the output of the arrays of light sources 330 (e.g., controlling output radiant flux of the light sources), control the operation of the imaging sensor 325, etc. The controller 305 includes a plurality of electrical and electronic components that provide power, operational control, and protection to the components and modules within the controller 305 and/or the system 300. For example, the controller 305 includes, among other things, a processing unit 335 (e.g., a microprocessor, a microcontroller, an electronic processor, an electronic controller, or another suitable programmable device), a memory 340, input units 345, and output units 350. The processing unit 335 includes, among other things, a control unit 355, an arithmetic logic unit ("ALU") 360, and a plurality of registers 365 (shown as a group of registers in FIG. 3), and is implemented using a known computer architecture (e.g., a modified Harvard architecture, a von Neumann architecture, etc.). The processing unit 335, the memory 340, the input units 345, and the output units 350, as well as the various modules connected to the controller 305 are connected by one or more control and/or data buses (e.g., common bus 370). The control and/or data buses are shown generally in FIG. 3 for illustrative purposes.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 335 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the system 300 can be stored in the memory 340 of the controller 305. The software includes, for example, firmware, one or more applications, program data, filters, rules, one or more program modules, and other executable instructions. The controller 305 is configured to retrieve from the memory 340 and execute, among other things, instructions related to the control processes and methods described herein. In other constructions, the controller 305 includes additional, fewer, or different components.

The user interface 315 is included to provide user input to the system 300 and controller 305. The user interface 315 is operably coupled to the controller 305 to control, for example, the output of the arrays of light sources 330, the imaging sensor 325, etc. The user interface 315 can include any combination of digital and analog input devices required to achieve a desired level of control for the system 300. For example, the user interface 315 can include a computer having a display and input devices, a touch-screen display, a plurality of knobs, dials, switches, buttons, faders, or the like.

The power input circuit 320 supplies a nominal AC or DC voltage to the system 300 and components within the system 300. The power input circuit 320 can be powered by mains power having nominal line voltages between, for example, 100V and 240V AC and frequencies of approximately 50-60 Hz. The power input circuit 320 is also configured to supply lower voltages to operate circuits and components within the system 300 (e.g., controller 305). Additionally or alternatively, the system 300 can receive power from one or more batteries or battery packs. The system 300 may also control the radiant flux of the arrays of light sources 330 by controlling the voltage drop across the one or more light sources 330, an amount of current provided to the light sources 330, or the like. In some embodiments, a variable resistor such as a transistor may be utilized.

The controller 305 is configured to provide drive signals to the drivers 310 for each of the arrays of light sources 330. Based on the provided drive signals, each of the drivers 310 generates a drive signal corresponding to a standard or operational radiant flux for its respective waveband of light (e.g., an amount of radiant flux continuously produced during normal or standard operation of the light sources 330). When controlling the arrays of light sources 330, the controller 305 is configured to control the arrays of light sources 330 to produce a pulse of light (e.g., a pulse of light bright enough to cause fluorescence in a plant or crop). The timing of such control operation can be programmed into the memory 340 of the controller 305. The timing of the light pulse operation includes a first period of time (e.g., a blackout period) during which the arrays of light sources 330 produce little or no light. The first period of time is followed by a pulse period of time. The pulsed period of time is followed by a measurement period of time. During the measurement period of time, for example, the imaging sensor 325 (e.g., a fluorimeter) is operated to capture an image of a scene or object.

Figure 4:
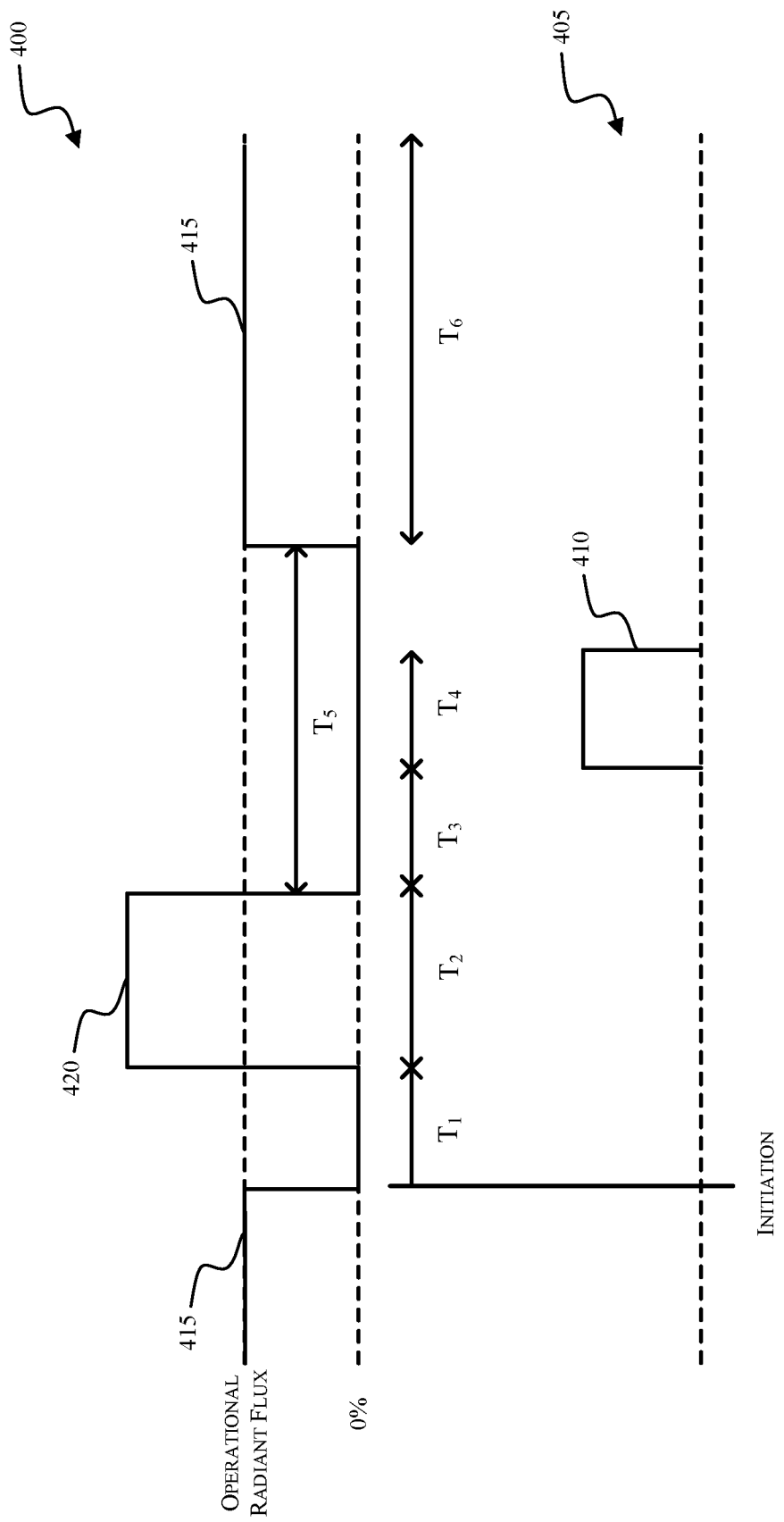
FIG. 4 is a power pulse timing diagram for a light fixture.

The timing of the light pulse operation is illustrated in more detail in FIG. 4 with respect to a light output 400 (e.g., light output of a light fixture) and an image capture synchronization signal 405. The pulse timing process is initiated before time, $T_1$. Initiation can be manual (e.g., triggered by a user) or automated by the controller 305 (e.g., scheduled at regular intervals). The first time period, $T_1$, is a period of darkness (or near darkness) for an object (e.g., a plant) to settle into the darkness. In some embodiments, the length of the first time period, $T_1$, is between approximately 10 seconds and 100 seconds. At the second time period, $T_2$, the light output of the arrays of light sources 330 is pulsed at high power (e.g., 2-5 times the normal maximum standard or operational radiant flux). In some embodiments, the length of the second time period, $T_2$, is between approximately 5 milli-seconds and 500 milli-seconds. At the third time period, $T_3$, a delay is introduced from the end of the light pulse before an image is captured. In some embodiments, the length of the third time period, $T_3$, is between approximately 1 milli-second and 1 second.

At the fourth time period, $T_4$, an image synchronization pulse 410 is generated to control the operation of the imaging sensor 325. The fourth time period, $T_4$, is sufficiently long to activate the imaging sensor 325 or an external camera system (e.g., to control a shutter open). In some embodiments, the length of the fourth time period, $T_4$, is between approximately 10 milli-seconds and 10 seconds. The fifth time period, $T_5$, is the total period of darkness (or near darkness) for the image capture to be completed. In some embodiments, the fifth time period, $T_5$, is set to be greater than the sum of the third time period, $T_3$, and the fourth time period, $T_4$ (e.g., between 11 milli-seconds and 11 seconds). The sixth time period, $T_6$, is used to prevent the pulse operation from being overused (e.g., to prevent crop damage, overload of a power supply, etc.). In some embodiments, the length of the sixth time period, $T_6$, is between approximately 5 minutes and 30 minutes. At the end of the sixth time period, $T_6$, an arbitrary amount of time can elapse before the next initiation of the pulse operation. The normal radiant flux and spectrum of the system 300 is shown at 415 in FIG. 4 (e.g., for a growing fixture). This normal radiant flux 415 (e.g., for continuous, standard operation of the light source) may result from a current provided to the array of light sources 330 that is, for instance, between 100 mA and 1500 mA depending on the type of light source 330. Examples may include, for instance, 100 mA, 200 mA, 300 mA, 500 mA, 1000 mA, 1500 mA, or the like. The light pulse 420 corresponds to an elevated momentary pulse radiant flux (e.g., greater than the radiant flux for continuous, standard operation of the light source) and spectrum of light used for the pulse. The light pulse 420 may result from a current provided to the array of light sources 330 that is as much as several times the current provided to the array of light sources 330 to produce the normal flux 415. In some embodiments, this light pulse 420 may result from a current that is, for instance, between 500 mA and 5000 mA. Examples may include, for instance, 500 mA, 1000 mA, 2000 mA, 5000 mA, or the like. In some embodiments, the spectrum of light used for the pulse 420 is different than the spectrum of light used for normal 415.

Figure 5:
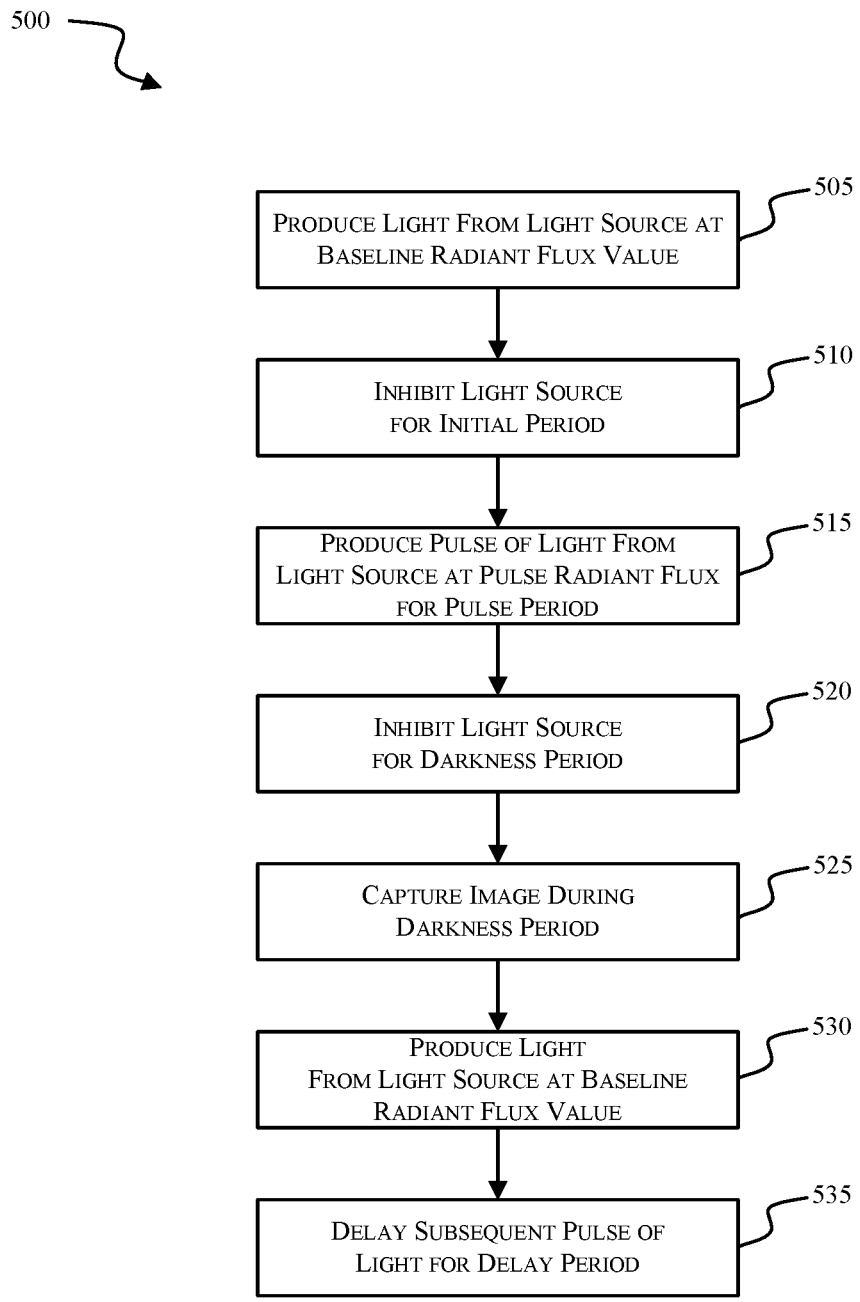
FIG. 5 is a flowchart illustrating the operation of a light source.

The operation of the arrays of light sources 330 according to the controller 305 is illustrated in FIG. 5. The method 500 begins with the arrays of light sources 330 producing light (e.g., light 140, 145, 150, 155 or light 235, 240, 245, 250) at a baseline radiant flux value 415 (step 505). Next, the arrays of light sources 330 are inhibited for an initial period $T_1$ (step 510). Then, the arrays of light sources 330 produce a pulse of light (e.g., light 140, 145, 150, 155 or light 235, 240, 245, 250) at a pulse radiant flux value 420 for a pulse period $T_2$ (step 515). Next, the arrays of light sources 330 are once more inhibited for a darkness period $T_3$ and $T_4$ (step 520). During the darkness period $T_3$, the imaging sensor 325 is activated to capture an image of the scene or object (step 525). After the darkness period $T_3$ and $T_4$, the arrays of light sources 330 resume producing light (e.g., light 140, 145, 150, 155 or light 235, 240, 245, 250) at the baseline radiant flux value 415 (step 530). While the light sources 330 are once more producing light (e.g., light 140, 145, 150, 155 or light 235, 240, 245, 250) at the baseline radiant flux value 415, the next pulse of light is delayed for a delay period $T_6$ (step 535). In some embodiments, the method 500 then continues by returning to step 505 to perform another pulse cycle.

Thus, embodiments described herein provide, among other things, systems, devices, and methods for generating a light pulse using light sources in a light fixture (e.g., a growing luminaire) to cause fluorescence in an object, such as a plant or crop.

What is claimed is:

1. A system for generating a light pulse to cause fluorescence in an object and for generating a control signal to operate a detector to capture the fluorescence, the system comprising:
   a light emitting diode ("LED") light source configured to emit light onto the object, the LED light source having an operational radiant flux;
   an imaging sensor configured to sense light emitted due to fluorescence in the object; and
   a controller connected to the LED light source, the controller configured to:
   drive the LED light source to produce the operational radiant flux, drive the LED light source to produce a pulse of light at a pulse radiant flux, and reduce the radiant flux of light produced by the LED light source to below a predetermined value after the pulse for a darkness period, wherein the pulse radiant flux of the light produced by the LED light source is greater than the operational radiant flux of the LED light source.

2. The system of claim 1, wherein the controller is further configured to inhibit the LED light source from producing light having a radiant flux above the predetermined value during an initial period of darkness prior to the pulse of light.

3. The system of claim 2, wherein the initial period of darkness is between 10 and 100 seconds.

4. The system of claim 1, wherein the pulse radiant flux is at least two times greater than the operational radiant flux of the LED light source.

5. The system of claim 1, wherein the pulse of light persists between 5 and 500 milli-seconds.

6. The system of claim 1, wherein the darkness period persists at least between 11 milli-seconds and 11 seconds.

7. The system of claim 1, wherein the controller is further configured to delay a subsequent pulse for at least between 5 and 30 minutes.

8. The system of claim 1, wherein the controller is further configured to drive the LED light source at a baseline radiant flux value before the pulse and after the darkness period, the baseline radiant flux value being at or below the operational radiant flux of the LED light source.

9. The system of claim 1, wherein:
the controller is connected to the imaging sensor; and
the controller is further configured to:
receive signals from the imaging sensor during a measurement period as imaging data, and
store the imaging data.

10. The system of claim 9, wherein the controller is further configured to delay the measurement period until after the pulse has ended.

11. The system of claim 10, wherein the measurement is delayed between 1 milli-second and 1 second.

12. The system of claim 9, wherein the controller is further configured to activate the imaging sensor after the pulse.

13. A method of operating a light emitting diode ("LED") light source to cause fluorescence in an object, the method comprising:
producing light from the LED light source at an operational radiant flux;

inhibiting the LED light source from producing light having a radiant flux above a predetermined value during an initial period;

producing a pulse of light from the LED light source during a pulse period, the pulse of light having a pulse radiant flux that is greater than the operational radiant flux of the LED light source;

inhibiting the LED light source from producing light having a radiant flux above the predetermined value during a darkness period after the pulse period; and delaying a subsequent pulse of light from the LED light source for a delay period.

14. The method of claim 13, further comprising:
producing light from the LED light source at a baseline radiant flux value both before the initial period and after the darkness period, the baseline radiant flux value having a radiant flux that is at or below the operational radiant flux of the LED light source.

15. The method of claim 13, further comprising:
operating an imaging sensor during at least a portion of the darkness period.

16. The method of claim 13, wherein the initial period persists between 10 and 100 seconds.

17. The method of claim 13, wherein the pulse period persists between 5 and 500 milli-seconds.

18. The method of claim 13, wherein the darkness period persists between 11 milli-seconds and 11 seconds.

19. The method of claim 13, wherein the delay period persists at least between 5 and 30 minutes.

20. A non-transitory computer readable medium having stored thereon a program for operating a light emitting diode ("LED") light source to cause fluorescence in an object, the program being executable by a controller such that the controller is configured to:

produce light from the LED light source at a baseline radiant flux value, the baseline radiant flux value having a radiant flux that is at or below an operational radiant flux of the LED light source;

inhibit the LED light source for an initial period;

produce a pulse of light from the LED light source for a pulse period, the pulse of light having a pulse radiant flux that is higher than the operational radiant flux of the LED light source;

inhibit the LED light source after the pulse for a darkness period; and produce light from the LED light source at the baseline radiant flux value after the darkness period.

* * * * *